July 28, 1959 D. C. PRINCE 2,897,267

RECORDING AND TRANSLATING OF INTELLIGENCE

Filed May 8, 1953 2 Sheets-Sheet 1

Inventor
David C. Prince
by Davis, Hoxie & Faithfull
attys.

July 28, 1959 D. C. PRINCE 2,897,267

RECORDING AND TRANSLATING OF INTELLIGENCE

Filed May 8, 1953 2 Sheets-Sheet 2

Inventor
David C. Prince
by Davis, Hoxie & Faithfull
Att'ys.

United States Patent Office 2,897,267

Patented July 28, 1959

2,897,267

RECORDING AND TRANSLATING OF INTELLIGENCE

David C. Prince, Schenectady, N.Y.

Application May 8, 1953, Serial No. 353,795

1 Claim. (Cl. 178—17)

This invention relates to a method and apparatus for storing and translating coded intelligence.

It is well known in the recording art to mark or punch a card or tape in discrete areas located according to a predetermined code thereby making it possible to store information for longer or shorter periods of time. Various methods have been devised to translate this information into a usable form as it is required, for example, as in business machines wherein the information is coded by means of holes punched in relatively stiff cards which are sorted by mechanical or electrical feelers so that the information can be read from the cards so selected. Stylus electrodes or feelers are also used to detect the presence of apertures or conducting areas on a card or tape, the resulting variations in the flow of electrical energy constituting an input signal for controlling the operation of a recorder such as an electric typewriter. Although the above mentioned devices have been successfully used for a number of years, their operation is relatively slow, special recording material is required, the holes and apertures therein are large thus limiting the amount of information which can be stored, and the record is subjected to mechanical wear when used. These inherent disadvantages have lead to the various proposals for the use of magnetic records, such as tapes of a retentive magnetic material, upon which the information is recorded by a varying magnetic field, but such magnetic means of storing information has also been found to have its limitations in that the record is adversely affected by the previous magnetic history of the tape, stray magnetic fields, and variations in the playback speed.

It is accordingly the objects of this invention to provide a method of storing information and apparatus for carrying out thereof which form a permanent record, which are not affected by the previous magnetic history of the record material or stray magnetic fields, which do not depend upon the rate of movement of the record during playback, which reduce the physical size of the required record, which permit more characters per unit of record area, which require less storage space, which can be visually translated, which permit the record to be readily changed and corrected, which are rapid in operation, which are adapted for use with an electric typewriter with only minor changes thereto, which do not require a web of special paper or other material, and which advance the art generally.

Such objects are obtained, according to the present invention, by applying to discrete areas of a web, such as a sheet, card or tape of paper or other non-magnetic material, a magnetic material, such as soft iron, having a low magnetic retentivity so that the effect of any magnetic field thereupon is only temporary. The discrete areas are preferably linearly disposed in groups, the arrangement of the areas in each group being according to a code so that groups correspond to respective preselected symbols or characters. The iron or other magnetic material is preferably powdered and applied to the web as an ink which may also include carbonaceous or a similar material so as to leave a visible mark. Although the ink can be applied manually in a liquid form by means of a stylus or pen, it is usually more expedient to impregnate a typewriter ribbon with the iron-bearing ink and apply the iron to the selected discrete areas of the web by means of a typewriter having type bars which have raised portions disposed according to the code arrangement for the corresponding symbol or character. In most instances it is also advisable to retain the raised facsimile of the corresponding character on the type bar so that a visual record is made simultaneously with the magnetic record. This procedure has the advantage of permitting the record to be proof-read visually without the necessity of "playing back," and corrections can be readily made by an ordinary eraser which will remove the iron as well as the carbon particles. The information is transcribed from the record into a usable form by a magnetic pick-up or transducer.

Although the presence of the areas of magnetic material can be detected by the electrical current pulses induced in a conventional transducer, such as a solenoid wound upon the core carrying a uni-directional magnetic flux, wherein the reluctance of the path is changed and therefore the amount of flux by the proximity of an area of magnetic material to the air gap of the core, a more sensitive detector can be obtained, which is independent of the rate of relative movement of the magnetic material with respect to the transducer, by applying an alternating current to a magnetizing winding of a core to induce an alternating flux therein. The resulting change in reactance when a magnetic area is brought adjacent the core air gap can be measured, for example, by a bridge circuit.

These and other objects and aspects of the invention will be apparent from the following description of several specific embodiments which refer to drawings wherein.

Figures 1, 2, 3, 4, 5:
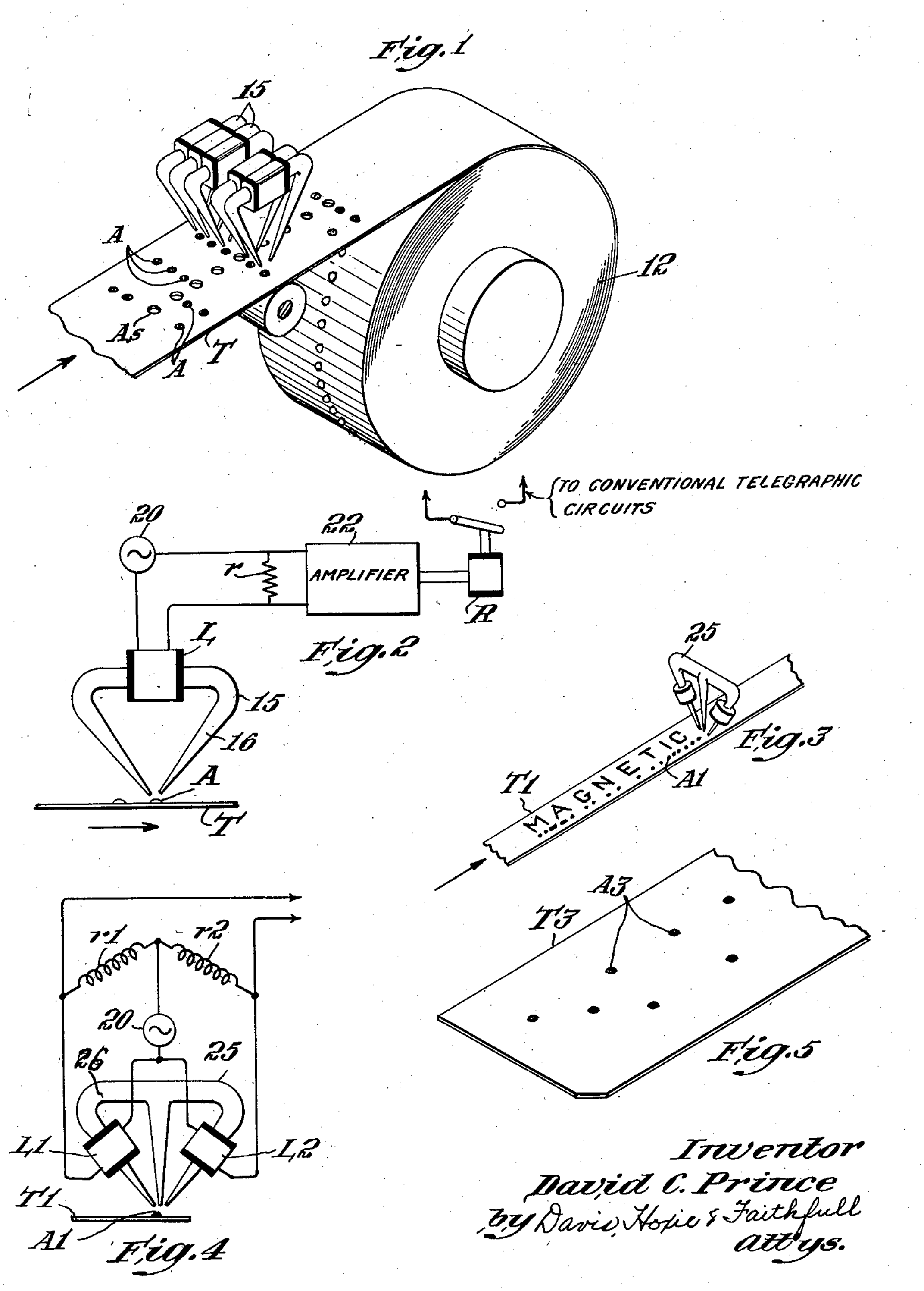
Fig. 1 is a partial isometric view of one embodiment of the invention wherein is used a tape similar to that used in a telegraphic system.
Fig. 2 is a schematic view of one of the transducers and associated circuit for use with the embodiment of Fig. 1.
Fig. 3 is a isometric view of a second embodiment for use with a single transducer.
Fig. 4 is a schematic view of the transducer used in the embodiment of Fig. 3.
Fig. 5 is an isometric view of a card such as used in a business machine modified for use according to the present invention.

The first embodiment of the invention shown in Fig. 1 is particularly adapted for use with existing tape type telegraphic equipment. To this end a web in the form of a tape or ribbon T having the same width and being similarly provided with a centrally disposed row of timing or synchronizing holes *As* as a standard telegraphic tape is provided so that the tape T can be advanced by the conventional feeding means of which only the take-up reel 12 is shown. The perforations of the standard telegraphic tape forming the coded symbols whereby the intelligence or information to be transmitted are impressed thereupon are replaced in the tape T by discrete areas A of magnetic material, which have the same relative positions as the corresponding perforations. The magnetic material of the discrete areas is of soft iron or other material having a low magnetic retentivity which is applied as described in detail hereinafter.

The electrical circuit making brushes or "feelers" of the conventional telegraphic equipment, which are rendered conducting through the standard tape perforations, are replaced by magnetic transducers such as the "pick-ups" 15. As is shown in Fig. 2, each "pick-up" 15 comprises a solenoid, such as the winding L, upon a core 16 having arms which are tapered and decrease in cross-sectional area to small faces defining a short air gap. The "pick-ups" 15 are mounted side by side in a row extending transversely of the tape T, as shown in Fig. 1, so that their air gaps are disposed adjacent the surface of the tape T carrying the magnetic material. The lateral spacing of the "pick-ups" 15 is made such that as the tape T is moved each corresponding air gap scans a longitudinally disposed band corresponding in position laterally of the tape to one of the selected locations of the areas A of magnetic material distributed on the tape according to the code. For example, if the standard telegraphic tape code is used, five "pick-ups" 15 are required to scan all of the five possible spaced positions of the magnetic areas corresponding in lateral location to the five positions of the perforations in the conventional telegraphic tape.

The winding L of each "pick-up" 15 is connected in series with an alternating power source, such as the oscillator 20 and a resistor *r* which is also connected across the input terminals of an amplifier 22 as is shown in Fig. 2. The output terminals of the amplifier 22 are connected to energize the coil of a relay R whose normally closed contacts are connected to complete a circuit (not shown) similar to that energized by the contacts of the conventional telegraphic equipment which circuit forms no part of the present invention and so need not be described further. In operation the gain of the amplifier is adjusted so that its output is sufficient to energize the relay R, opening the relay contacts when the inductance of the solenoid L is at a minimum and the IR drop across the resistance *r* is also minimized. The resulting increase in the effective inductance of the solenoid L when a magnetic material is adjacent the air gap of the core 16 causes a decrease in the voltage drop across the resistor *r* so that the output of the amplifier does not supply sufficient energy to hold open the relay contacts. It will be apparent from the above that as each discrete area A of magnetic material is brought adjacent the air gap by the movement of the tap T, the relay contacts close to have the same electrical effect upon the telegraphic circuit as if the circuit had been completed through a perforation in a conventional tape. It will also be understood that the above simplified circuit is shown only by way of example and that other circuits performing an analogous function can be substituted therefor.

A tape T bearing magnetized discrete areas as described above, has several distinct advantages over a standard tape. Being imperforated, the magnetized tape can be made both thinner and of a material of a lower tensile strength which need not be lint-free. A further advantage can be realized by reducing the width of the tape. This is achieved by reducing the diameter of the magnetic areas as at A1 and arranging them in the groups aligned lengthwise of the tape T1, as is shown in Fig. 3. This arrangement permits the use of a single transducer 25 which for greater sensitivity preferably has an E-shaped core 26 with two air gaps, as can best be seen in Fig. 4. On the outer legs of the core 26 are wound respective solenoids L1 and L2 which are connected as arms of an alternating current bridge whose opposing arms are formed by impedances *r1* and *r2*. The transducer core 26 and the circuit elements of the bridge are made symmetrical so that normally there is no output from the bridge when it is energized by an alternating power source such as the oscillator 20. The introduction of a magnetic body such as the discrete magnetic areas A1 of the tape T1 adjacent one of the air gaps by the movement of the tape changes the reluctance of the solenoid on the corresponding core leg thereby unbalancing the bridge. The resulting output of the bridge is amplified and applied to a conventional transcriber such as an electric typewriter, in the usual manner.

The advantages of using a magnetic code are not limited to webs in the form of tapes such as described heretofore but are equally applicable to cards such as T3 (Fig. 5). The card other than being imperforate is similar to the cards used in conventional business machines so that the cards can be used with a minimum of conversion of existing equipment. The perforations of the standard cards are replaced by discrete areas of magnetic material, such as A3, which are disposed in the same relationship as the standard perforations.

If only a few symbols or corrections are required on either the tapes or cards, the magnetic areas can be applied either manually or mechanically by pen by suspending soft iron filings or powder in a suitable liquid to form an "ink" similar to a drawing ink. Preferably a carbonaceous material, such as carbon black, is also included so that the area of application is more readily visible.

Figures 6, 7:
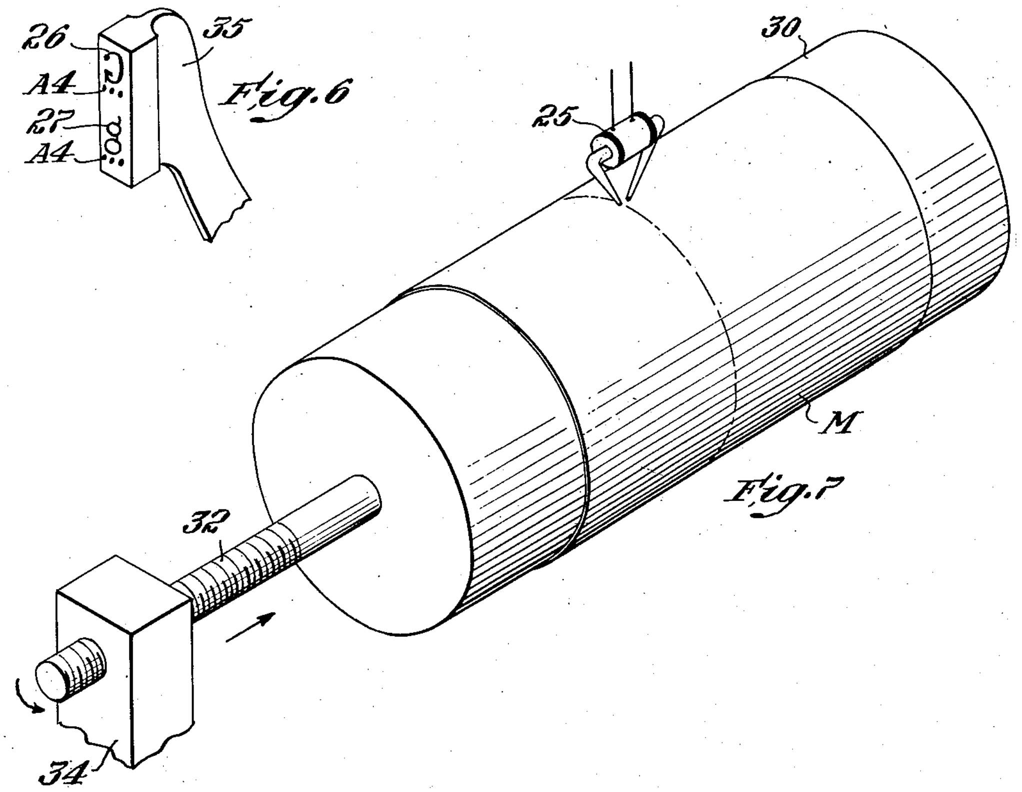
Fig. 6 is an isometric view of a type bar for a conventional typewriter which has been modified for making ribbon copy for use with the present invention.
Fig. 7 is an isometric view of a third embodiment of the invention wherein the ribbon copy is a letter sheet.

A more advantageous manner of applying the magnetic spots is to impregnate a ribbon with finely divided iron in a manner similar to that in which carbon black is applied to a typewriter ribbon. In the case of the tape shown in Fig. 1, the conventional punching equipment is modified to press such a ribbon against the surface of the tape rather than pierce holes therein so that the magnetic particles are deposited upon the selected areas. When the magnetic spots are arranged linearly as on the tape T2 shown in Fig. 3, the most advantageous manner of applying the spots is by means of a typewriter having special typebars. As can be seen in Fig. 6, the typebar 25 for the character "G," in addition to the usual upper and lower case symbols 26 and 27, is provided with a series of raised portions or dots 28 disposed respectively beneath each of the symbols. The series of dots 28 are arranged according to the selected code sequence corresponding to the letter "G" so that as the typebar 25 brings the typewriter ribbon (not shown) into forceable contact with the tape T2 in the well known manner, both carbonaceous and iron particles are deposited upon the surface of the tape in areas which define both the symbol "G" and the corresponding code portions immediately beneath the symbol. As only the longitudinal band of the tape T2 is scanned by the transducer 25 as is shown in Figs. 3 and 4, the iron particles located within the area defining the symbol "G" have no effect upon the transducer. Conversely, the carbonaceous particles deposited within the areas covered by the raised dots 28 have a permeability of substantially unity so they do not interfere with the magnetic field in the transducer. The other typebars (not shown) of the typewriter are similarly provided with raised portions corresponding to their respective symbols so that the coded information can be typed upon the tape by anyone skilled in the use of the typewriter. Although for most applications it is desirable to print both the symbol and the code, thus permitting visual proof-reading and correction, it is to be understood that my invention is not limited thereto and that there are instances, such as when the information is sent over a transmission link immediately after being typed, wherein the symbols can be omitted and only the code dots A4 included on the typebar.

Figure 8:
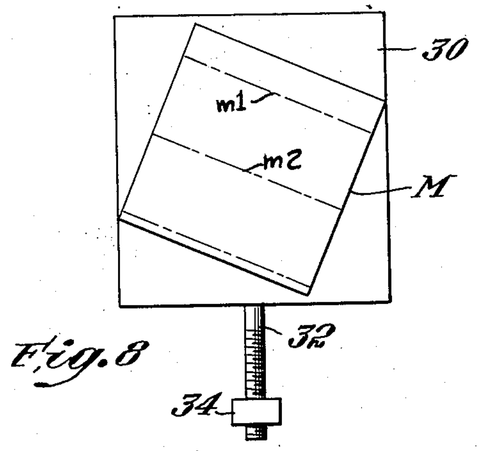
Fig. 8 is a developed view of the embodiment of Fig. 7.

When both the symbols and code dots are incorporated in the typebar, the typewriter can be used for writing letters, business forms, checks, memoranda and the like. Rather than sending copies of such items to the various departments in a factory or to distant points by means of the mails, the code may be used to transmit the information thereupon by means of telegraphic or telephone lines. To this end the type sheet, such as M, is wrapped about the periphery of a drum 30 and held by clips (not shown) in a skewed manner as is indicated in a greatly exaggerated manner in Fig. 8 wherein the periphery of the drum is shown developed. The angularity of the sheet is adjusted with respect to the axis of the drum 30 so that the end of a first line *m*1 of type is brought adjacent the beginning of the succeeding line *m*2 as the paper is wrapped about the drum. The drum 30 is carried upon a shaft 32, the drum being affixed thereto so that there is no relative motion therebetween. The shaft 32 is provided with a left-hand thread which engages the corresponding threads in a stationary block 34. The shaft 32 and the drum 30 are conjointly rotated, for example, by a motor (not shown), in a counterclockwise direction as viewed in Fig. 7 which because of the left-hand thread moves the drum axially away from the stationary block 34. The pitch of the shaft thread is made such that for each revolution of the drum 30 it is advanced axially away from the block 34 a distance equal to the spacing between two adjacent rows of type on the sheet M. It will be apparent that if a transducer such as the "pick-up" 25 is positioned adjacent the periphery of the drum so that the magnetic code areas of the first line are positioned under one of its air gaps, the successive rows will successively pass thereunder as the drum 30 is rotated, i.e., the transducer will scan the coded information. The unbalance of the bridge connected to the transducer 25 resulting as each magnetic spot passes under the air gap causes an electrical signal, as described above, which can be practically instantaneously transmitted by any of the ordinary communication links to any desired number of stations, at each of which is located a suitable recorder, such as an electrical typewriter or a tape recorder that responds to the coded input signals.

It should be understood that the present disclosure is for the purpose of illustration only and that this invention includes all modifications and equivalents which fall within the scope of the appended claim.

I claim:

The method of storing and translating intelligence comprising the steps of applying a magnetic material having a low retentivity to a non-magnetic web only over discontinuous discrete areas thereof which are of uniform size and shape and which are selected and irregularly spaced according to a predetermined code, said discrete areas of magnetic material being of a color contrasting to the color of the web and being arranged in a row of groups of discrete areas, each group corresponding to a predetermined symbol, thereby to form a coded record of intelligence depicted by discrete visible areas which are coextensive with discrete areas of magnetic material of low retentivity, setting up a localized magnetic field apart from the web and with reference to which the web is movable, and translating said intelligence by bringing said discrete areas of the web into the magnetic field to cause a change in the flux thereof, and transforming the resulting flux changes into corresponding electrical variations.

References Cited in the file of this patent

UNITED STATES PATENTS

| | | |
|---|---|---|
| Re. 23,385 | Knutsen | July 3, 1951 |
| 1,152,562 | Sherman | Sept. 7, 1915 |
| 1,815,010 | Pollock et al. | July 14, 1931 |
| 2,114,294 | Green | Apr. 19, 1938 |
| 2,254,931 | Bryce | Sept. 2, 1941 |
| 2,337,553 | Hofgaard | Dec. 28, 1943 |
| 2,550,427 | Potts | Apr. 24, 1951 |
| 2,554,794 | Potts | May 29, 1951 |
| 2,559,505 | Hillier | July 3, 1951 |
| 2,584,318 | Allyn | Feb. 5, 1952 |
| 2,608,621 | Peterson | Aug. 26, 1952 |
| 2,649,568 | Felch et al. | Aug. 18, 1953 |
| 2,737,342 | Nelson | Mar. 2, 1956 |
| 2,751,433 | Linger | June 19, 1956 |
| 2,784,392 | Chaimowicz | Mar. 5, 1957 |
| 2,791,310 | Jones | May 7, 1957 |

FOREIGN PATENTS

| | | |
|---|---|---|
| 324,994 | Great Britain | Feb. 10, 1930 |
| 703,916 | France | May 8, 1931 |

OTHER REFERENCES

Krauss: "Electromagnetics," 1st ed., McGraw-Hill.

"Ferromagnetography, High Speed Printing With Shaped Magnetic Field," by T. M. Berry and J. P. Hanna, found in General Electric Review, July 1952, pages 20 and 21 and 61.